United States Patent [19]

Thompson et al.

[11] Patent Number: 6,054,106
[45] Date of Patent: Apr. 25, 2000

[54] MAGNESIOSILICATES

[75] Inventors: John G. Thompson; Alexandra Melnitchenko; Stephen R. Palethorpe; Charlene J. Lobo, all of Australian Capital Territory, Australia

[73] Assignee: The Australian National University, Australian Capital Territory, Australia

[21] Appl. No.: 09/043,087

[22] PCT Filed: Sep. 13, 1996

[86] PCT No.: PCT/AU96/00576

§ 371 Date: Jun. 10, 1998

§ 102(e) Date: Jun. 10, 1998

[87] PCT Pub. No.: WO97/10179

PCT Pub. Date: Mar. 20, 1997

[30] Foreign Application Priority Data

Sep. 13, 1995 [AU] Australia ................. PN5382

[51] Int. Cl.⁷ ............... C01B 33/22; C01B 33/32; C11D 3/08

[52] U.S. Cl. ............ 423/331; 423/326; 423/328.2; 423/332; 510/507; 510/511; 510/531; 510/532

[58] Field of Search .............. 423/331, 332, 423/328.2; 510/276, 507, 511, 531, 532

[56] References Cited

U.S. PATENT DOCUMENTS

| | | | |
|---|---|---|---|
| 4,049,780 | 9/1977 | Neumann .............. | 423/331 |
| 4,054,537 | 10/1977 | Wright et al. .......... | 423/331 |
| 4,430,249 | 2/1984 | Gate . | |
| 4,542,002 | 9/1985 | Corma et al. .......... | 423/331 |
| 4,585,642 | 4/1986 | Rieck ................ | 423/333 |

(List continued on next page.)

FOREIGN PATENT DOCUMENTS

| | | |
|---|---|---|
| 0 209 840 A2 | 1/1987 | European Pat. Off. . |
| 0 384 070 A2 | 8/1990 | European Pat. Off. . |
| 0 543 443 A2 | 5/1993 | European Pat. Off. . |
| 0 549 323 A1 | 6/1993 | European Pat. Off. . |
| 0 550 048 A1 | 7/1993 | European Pat. Off. . |

(List continued on next page.)

OTHER PUBLICATIONS

Shannon, R.D., "Ionic Conductivity in Sodium Magnesium Silicates," *Phys. Chem. Minerals*, 4:139–148 (1979) (No Month).

Foris et al., "Crystal Data for $Na_4Mg_2Si_3O10$," *J. App. Cryst.*, 12:405–406 (1979) (No Month).

Berezhnoi et al., "Characteristics of Multicomponent High–Basic Silicates of the System $Na_2O$–$K_2O$–$CaO$–$MgO$–$SiO_2$," *Izvestiya Akademii Nauk SSSR, Neorganicheskie Materialy*, 12(9):1653–1658 (Sep. 1976).

Roedder, E.W., "The System $R_2O$–$MgO$–$SiO_2$," *Amer. J. Sci.*, 249:224–281 (1951) (No Month).

Buerger M.J., "The Stuffed Derivatives of the Silica Structures," *American Mineralogist*, 39:600–614 (1954) (No Month).

*Primary Examiner*—Mark L. Bell
*Assistant Examiner*—David Sample
*Attorney, Agent, or Firm*—Flehr Hohbach Test Albritton & Herbert LLP; David J. Brezner

[57] ABSTRACT

Novel magnesiosilicate compounds for use in detergent compositions and as water softeners have a calcium binding capacity of at least 10 mg CaO per gram, a magnesium binding capacity of at least 10 mg MgO per gram and a calcium binding rate of no more than 300 seconds, all at room temperature. The compounds have a stuffed silica polymorph-related structure or a layered structure with a broad X-ray powder diffraction peak at a d-spacing of between 11 and 17 Å. The compounds have an anhydrous composition $M_aMg_bAl_cSi_{1-(b+c)}O_d$, where M—alkali, $0.0<a<2.0$, $0.0<b<0.7$, $0.0 \leq c \leq 0.3$, $1.15<d<3.0$, $c<b$, and partial substitution of M, Mg, Al and Si is permitted. The compounds are prepared by solid state reaction or aqueous reaction of starting material such as magnesiosilicate mineral with alkali oxide-containing reagent under relatively mild conditions or by treating a magnesiosilicate compound having a stuffed silica polymorph-related structure with aqueous solution.

37 Claims, 6 Drawing Sheets high cristobalite

Idealised $Na_2MgSiO_4$

● silicon ○ oxygen
○ magnesium ⊙ oxygen (double density)
⊕ sodium

U.S. PATENT DOCUMENTS

| | | |
|---|---|---|
| 4,664,839 | 5/1987 | Rieck . |
| 4,737,306 | 4/1988 | Wichelhaus et al. .................... 423/331 |
| 4,749,676 | 6/1988 | Blumenthal et al. .................... 502/251 |
| 4,820,439 | 4/1989 | Rieck . |
| 4,950,310 | 8/1990 | Rieck et al. . |
| 4,987,106 | 1/1991 | Mizutani et al. ........................ 501/147 |
| 5,308,596 | 5/1994 | Kotzian et al. ......................... 423/333 |
| 5,559,070 | 9/1996 | Torii et al. .............................. 423/326 |

FOREIGN PATENT DOCUMENTS

| | | |
|---|---|---|
| 0 565 364 A1 | 10/1993 | European Pat. Off. . |
| 0 627 383 A1 | 12/1994 | European Pat. Off. . |
| 0 630 855 A2 | 12/1994 | European Pat. Off. . |
| 43 23 527 A1 | 1/1995 | Germany . |
| 58-181718 | 10/1983 | Japan . |
| 2-271910 | 11/1990 | Japan . |
| 8-059226 | 3/1996 | Japan . |
| 998822 | 7/1965 | United Kingdom . |
| 92/18594 | 10/1992 | WIPO . |
| 94/03572 | 2/1994 | WIPO . |
| 95/29978 | 11/1995 | WIPO . |
| 95/34505 | 12/1995 | WIPO . |
| 96/12674 | 5/1996 | WIPO . |

MAGNESIOSILICATES

TECHNICAL FIELD

This invention relates to magnesiosilicate compounds and is particularly concerned with such compounds which can be used as water softeners or detergent builders. The magnesiosilicate compounds may have other uses, including, for example, separating heavy metals and other contaminants.

BACKGROUND ART

In recent years there has been a trend towards low-phosphate and phosphate-free detergent formulations. To this end a number of non-phosphate detergent builders and water softeners have been developed. Na zeolite A, a synthetic aluminosilicate of composition $NaAlSiO_4$, has been used in high volumes for many years and is as effective as sodium tripolyphosphate (STPP) at removing calcium but not as effective at removing magnesium. This aluminosilicate zeolite has recently been joined by zeolite P (European Patent Applications 0 384 070 and 0 565 364) as a commercially used builder which shows enhanced exchange kinetics. Alternative technologies are based on soluble silicates (amorphous and crystalline) which soften water effectively and generally show better magnesium removal than Na zeolite A. A crystalline layered sodium silicate SKS-6 ($Na_2Si_2O_5$), which is used commercially, has also been developed by Hoechst AG and is described in U.S. Pat. Nos. 4,664,839, 4,820,439, 4,950,310 and 5,308,596. Also, crystalline sodium silicates with the kanemite structure and composition $NaHSi_2O_5.xH_2O$ have recently been developed by Hoechst AG, as described in European Patent Application 0 627 383.

Synthetic alkali magnesiosilicates having an anhydrous composition of $xM_2O.ySiO_2.zM'O$ where M represents Na and/or K; M' represents Ca and/or Mg; y/x is 1.4 to 2.1; z/x is 0.001 to 1.0; K/Na in $M_2O$ is 0 to 80; and Mg/Ca in M'O is 0 to 100 have recently been proposed by Kao Corporation in European Patent Application 0 630 855. These materials, which have a chain silicate structure as described in European Patent Application 0 550 048, are shown to have high calcium binding capacity and to have utility as water softeners and as alkali adjusting agents. In addition, they are described as particularly useful for their good moisture resistance (Japanese Patent Application Kokai 07,330,325).

Synthetic alkali magnesiosilicate compounds with the general formula $M_{2-2x}Mg_{1-x}Si_{1+x}O_4$, where M is an alkali metal, have been reported previously, as discussed below. However, these highly crystalline compounds have not been recognised as having properties that enable them to be used as water softeners or detergent builders.

The compounds $Na_2MgSiO_4$ (R. D. Shannon, *Phys. Chem. Miner.* 4, 139–148, 1979), $Na_4Mg_2Si_3O_{10}$ (C. M. Foris et al. *J. Appl. Cryst.* 12, 405–406, 1979) and $K_2MgSiO_4$ (E. W. Roedder, *Am. J. Sci.*, 249, 224248, 1951; A. S. Berezhnoi et al. *Izvestiya Akademiii Nauk SSSR, Neorganicheskie Materialy* 12, 1653–1658, 1976) have all been described as having structures closely related to that of the silica polymorph, cristobalite (see FIG. 1). It has also been proposed (E. W. Roedder, *Am. J. Sci.*, 249, 224–248, 1951) that in terms of the general formula $M_{2-2x}Mg_{1-x}Si_{1+x}O_4$, when M=K and x=0.5, i.e. $KMg_{0.5}Si_{1.5}O_4$, a compound is formed which has a structure closely related to that of the silica polymorph, tridymite (see FIG. 2).

Tridymite and cristobalite both have the composition $SiO_2$ and comprise a 3-dimensional framework of corner-connected $SiO_4$ tetrahedra. They are classified as framework silicates or tectosilicates.

By analogy with alkali aluminosilicate analogues, the cristobalite- and tridymite-related compounds described above can also be described as stuffed derivatives of the cristobalite and tridymite structures (M. J. Buerger, *American Mineralogist* 39 600–614, 1954), and therefore as stuffed silica polymorph-related structures, in that up to half of the silicon cations in the silicate framework in each case are replaced by magnesium cations. Alkali cations, which are required for charge balance ($Si^{4+}$<—>$Mg^{2+}$+$2M^+$, M=alkali) occupy the interstices in the respective frameworks (see FIGS. 1 and 2)—hence the descriptions "stuffed cristobalite" and "stuffed tridymite". Other stuffed silica polymorph-related structures include "stuffed quartz".

All of the above alkali magnesiosilicate compounds having stuffed silica polymorph-related structures were prepared from synthetic reagents and under reaction conditions that promoted the formation of very well crystallised and ordered materials.

SUMMARY OF THE INVENTION

We have now discovered that some forms of magnesiosilicate compounds not previously described, including some having a stuffed silica polymorph-related structure, can have advantageous water softening and detergency building properties, as measured in terms of a combination of their calcium binding capacities, their magnesium binding properties and their calcium binding rates. The aforementioned known magnesiosilicate structures having a stuffed silica polymorph-related structure may have had some but not all of these properties.

According to the present invention there is provided a magnesiosilicate compound having a calcium binding capacity (CBC) of at least 10 mg CaO per gram at room temperature, a magnesium binding capacity (MBC) of at least mg MgO per gram at room temperature. and a calcium binding rate (CBR) of no more than 300 seconds at room temperature, being the time taken to remove half of the $Ca^{2+}$ from a ~100 ppm $Ca^{2+}$ solution at a loading of 3 g per liter, and having either a stuffed silica polymorph-related structure or a layered structure with a characteristic broad X-ray powder diffraction peak occurring at a d-spacing of between 11 and 17 Å. Central to the present invention is the discovery that some stuffed silica polymorph-related magnesiosilicates, particularly those that are imperfectly crystallised and possess substantial disordering of the framework cations, and magnesiosilicates having a layered structure with a characteristic broad X-ray powder diffraction peak occurring at a d-spacing of between 11 and 17 Å, preferably between 12 and 16 Å, can have a significant calcium binding capacity (CBC). magnesium binding capacity (MBC) and a relatively high calcium binding rate (CBR) in aqueous solution. For the purposes of the present invention CBC is expressed in units of mg CaO per gram of anhydrous magnesiosilicate and MBC is expressed in units of mg MgO per gram of anhydrous magnesiosilicate, both at room temperature. Advantageously, the compounds of the invention may have a CBC of at least 20, preferably at least 50 and in many embodiments at least 100. Advantageously, the compounds of the invention may have an MBC of at least 15, preferably at least 40 and in many embodiments at least 90. When well-prepared, these new compounds may have a CBC of at least 150 and/or an MBC of at least 140. For the purposes of the present invention, CBR is expressed in terms of the time taken to remove half of the $Ca^{2+}$ from a ~100 ppm $Ca^{2+}$ solution at room temperature at a loading of 3 g per liter. Advantageously, compounds of the invention may have a CBR of no more than 200 seconds, preferably no more than 100 seconds, more preferably no more than 50 seconds, even more preferably no more than seconds, and most preferably no more than 10 seconds.

The compounds of the invention advantageously also have an oil absorption (OA) of at least 50 g oil per 100 g of anhydrous material, preferably at least 70 g oil, more preferably at least 100 g oil per 100 g of anhydrous material.

Methods for determining CBC, MBC, CBR and OA are described hereinafter.

The magnesiosilicate compounds of the invention may be characterised in terms of their composition, which may, in anhydrous form of the compounds, be given by $M_aMg_bAl_cSi_{1-(b+c)}O_d$, where M=alkali, optionally partially substituted by H or $NH_4$; where $0.0<a<2.0$, $0.0<b<0.7$, $0.0\leq c\leq 0.3$, and $1.15<d<3.0$, where $c<b$; where there may be partial substitution of the atoms (Mg+Al+Si) by one or more other elements T selected from the group B, Be, Zn, Ga, Fe, Ge, As and P such that T/(Mg+Al+Si)<0.1 and Mg is >0; where there may be partial substitution of the interstitial atoms M by one or more other elements A selected from the group alkaline earth, transition metal and rare earth elements such that A/M<0.2; and where impurity minerals or compounds which are not integrated into the structure are not accounted for in the composition. Such impurity minerals or compounds may include, for example, $TiO_2$-anatase and $SiO_2$-quartz.

Preferably, $0.4<a<1.4$, $0.2<b<0.6$, $0.0\leq c\leq 0.2$, and $1.5<d<2.5$; and where T/(Mg+Al+Si)<0.05. More preferably $0.6<a<1.3$, $0.35<b<0.6$, $0.0\leq c\leq 0.1$, and $1.65<d<2.25$; and where T/(Mg+Al+Si)<0.02. Advantageously, Mg/Ca$\leq$100 and Si/(Mg+Ca)<1.4.

As is clear from the composition above, the interstitial cations may be $K^+$ or $Na^+$, as in the compounds $Na_2MgSiO_4$, $Na_4Mg_2Si_3O_{10}$, $K_2MgSiO_4$, and $KMg_{0.5}Si_{1.5}O_4$, or it may be another alkali cation, such as $Li^+$, $Rb^+$ or $Cs^+$. The alkali cations may be partially substituted by one or more other monovalent cations, such as $NH_4^+$ or $H^+$. These materials may also be prepared such that a small proportion of the monovalent interstitial cations is substituted by polyvalent cations, such as alkaline earth, transition metal and rare earth cations. The interstitial sites may be occupied by a mixture of any two or more of the aforementioned cations. However, alkali metal cations are the preferred cations, in particular $Na^+$ or $K^+$.

It is believed that unreacted reagent anions which may be used in the synthesis of magnesiosilicate compounds in accordance with the invention, for example bicarbonate, carbonate, carboxylate, nitrate and hydroxide, are not integrated into the structures, and it is for this reason they are not included in the empirical composition above.

As described below, compounds in accordance with the invention may be made by aqueous routes, but we have discovered that advantageously such compounds having a stuffed silica polymorph-related structure may be readily made by solid state reaction routes. Thus, also according to the present invention, there is provided a process for the preparation of a magnesiosilicate compound in accordance with the invention and having a stuffed silica polymorph-related structure, which comprises subjecting a magnesiosilicate starting material, or a combination of magnesium oxide- and silicon oxide-containing reagents, to a solid state reaction with an alkali oxide-containing reagent.

A variety of synthetic solid state reaction methods is available for use in the above process, and some of these methods in which the interstitial cation is an alkali metal cation are described below. These reaction methods are preferably performed at a temperature of about 1000° C. or less, more preferably at a temperature in the range of about 450° C. to about 800° C. Temperatures greater than 1000° C. may be used to achieve reaction, but the time of reaction would necessarily be reduced to prevent the formation of well crystallised, ordered materials with a CBR>300 seconds. Advantageous to the successful synthesis of magnesiosilicate compounds in accordance with the invention and having a stuffed silica polymorph-related structure, are reactive starting materials, that is components or component precursors which facilitate reaction at the above relatively low temperatures. The relatively mild reaction conditions result in the formation of less well crystallised materials with substantial disordering of the framework cations, and it is this feature which is believed to lead to the relatively high CBR in the stuffed silica polymorph-related compounds of the invention.

Preferably, the magnesiosilicate compounds in accordance with the invention with a layered structure have their characteristic broad X-ray powder diffraction peak occurring at a d-spacing of from about 12 to about 16 Å.

Advantageously, the magnesiosilicate compounds according to the invention and having a layered structure are formed by an aqueous route and in one such route according to the invention the process comprises subjecting a magnesiosilicate starting material, or a combination of magnesium oxide- and silicon oxide-containing reagents, to aqueous reaction with an alkali oxide-containing reagent.

These reaction methods are preferably performed in a temperature range of from about 100° C. to about 300° C. in a sealed vessel, more preferably in a temperature range of from about 150° C. to about 200° C. Temperatures greater than 300° C. and/or elevated pressures may be used to achieve reaction, but the time of reaction would necessarily be reduced to ensure a compound in accordance with the invention is produced.

Advantageous to the successful synthesis of magnesiosilicate compounds having a layered structure in accordance with the invention are reaction starting materials, that is components or component precursors which facilitate reaction at the above relatively low temperatures.

To facilitate relatively mild reaction conditions for the formation of these magnesiosilicate compounds in accordance with the invention having either a stuffed silica polymorph-related structure or the layered structure by the processes described above, it is particularly advantageous to use a magnesiosilicate mineral starting material, which, by definition, contains magnesium and silicon atoms mixed on the unit cell, that is the nanometer, scale. With a high surface area and the preferred relatively mild reaction conditions, the magnesiosilicate minerals can lead to the formation of reactive, high surface area magnesiosilicate compounds in accordance with the invention having very high CBRs.

Magnesiosilicate phyllosilicates are, in general, suitable starting materials for the formation of these compounds. For the purposes of the present invention magnesiosilicate phyllosilicates are defined as phyllosilicates having more magnesium than aluminium in their composition and are thereby distinguished from aluminosilicate phyllosilicates containing some magnesium.

Such magnesiosilicate phyllosilicates include the clay mineral saponite, as well as the minerals talc and chrysotile. Most preferably, the phyllosilicate is saponite or talc. While there is a significant range in the silicon and magnesium contents of these starting materials, all are considered, to a greater or lesser extent, to be a suitable source of mnagnesiosilicate in the synthesis of the crystalline magnesiosilicates having either a stuffed silica polymorph-related structure or the layered structure.

One of the other advantages that mineral magnesiosilicates have as reactive starting materials is their high natural abundance and relatively low unit cost.

Various alkali salts and hydroxides are suitable reactive starting materials which provide a source of the alkali cations. Most alkali salts which decompose upon heating to 1000° C. to give alkali oxide are suitable. Alkali halides and alkali sulfides are not suitable.

It is also possible to use reactive forms of silica, such as silica gel and colloidal silica, in combination with reactive forms of magnesium, such as magnesium nitrate hexahydrate or magnesium basic carbonate, to provide the source of magnesiosilicate for use in the above processes of the invention.

We have also discovered that magnesiosilicate compounds in accordance with the invention and having the layered structure can be formed by aqueous routes from magnesiosilicate compounds having a stuffed silica polymorph-related structure.

Thus, further according to the present invention there is provided a process for the preparation of a magnesiosilicate compound in accordance with the invention and having the layered structure, which comprises treating a magnesiosilicate compound having a stuffed silica polymorph-related structure with aqueous solution.

The aqueous solution used in this rinsing treatment may be distilled water or it may be, for example, water containing small or large amounts of dissolved species, such as $Na^-$-containing solution. The treatment process leads to a change in composition relative to the starting material, for example such that the M/Mg ratio is reduced significantly and the Si/Mg ratio is reduced slightly.

Preferably, the magnesiosilicate compound having a stuffed silica polymorph-related structure is in accordance with the invention.

This process may be performed at room temperature. In a preferred embodiment the magnesiosilicate compound having a stuffed silica polymorph-related structure is dispersed in the aqueous solution, and residual solid is separated from the supernatant liquid and dried. The dispersing and separating steps may take no more than about minutes, preferably no less than about 10 minutes. The separated residual solid may be dried at less than about 100° C. preferably less than about 60° C. The separating step may be, for example, by centrifuging or by filtration.

Still further according to the present invention, there is provided the use of a magnesiosilicate compound in accordance with the invention as a water softener and/or as a detergent builder.

Yet still further according to the present invention, there is provided a detergent composition containing a magnesiosilicate compound in accordance with the invention and a surfactant.

Also still further according to the present invention, there is provided a moulded body comprising magnesiosilicate compound in accordance with the invention, optionally further comprising a binder. Such a moulded body may be a convenient form of the magnesiosilicate compound for use as a water softener.

BRIEF DESCRIPTION OF THE DRAWINGS

Various embodiments of the magnesiosilicates having a stuffed silica polymorph related structure and their aqueous derivatives, uses for them and processes for producing them will now be described by way of example only with reference to the accompanying drawings, in which.

Figure 1:
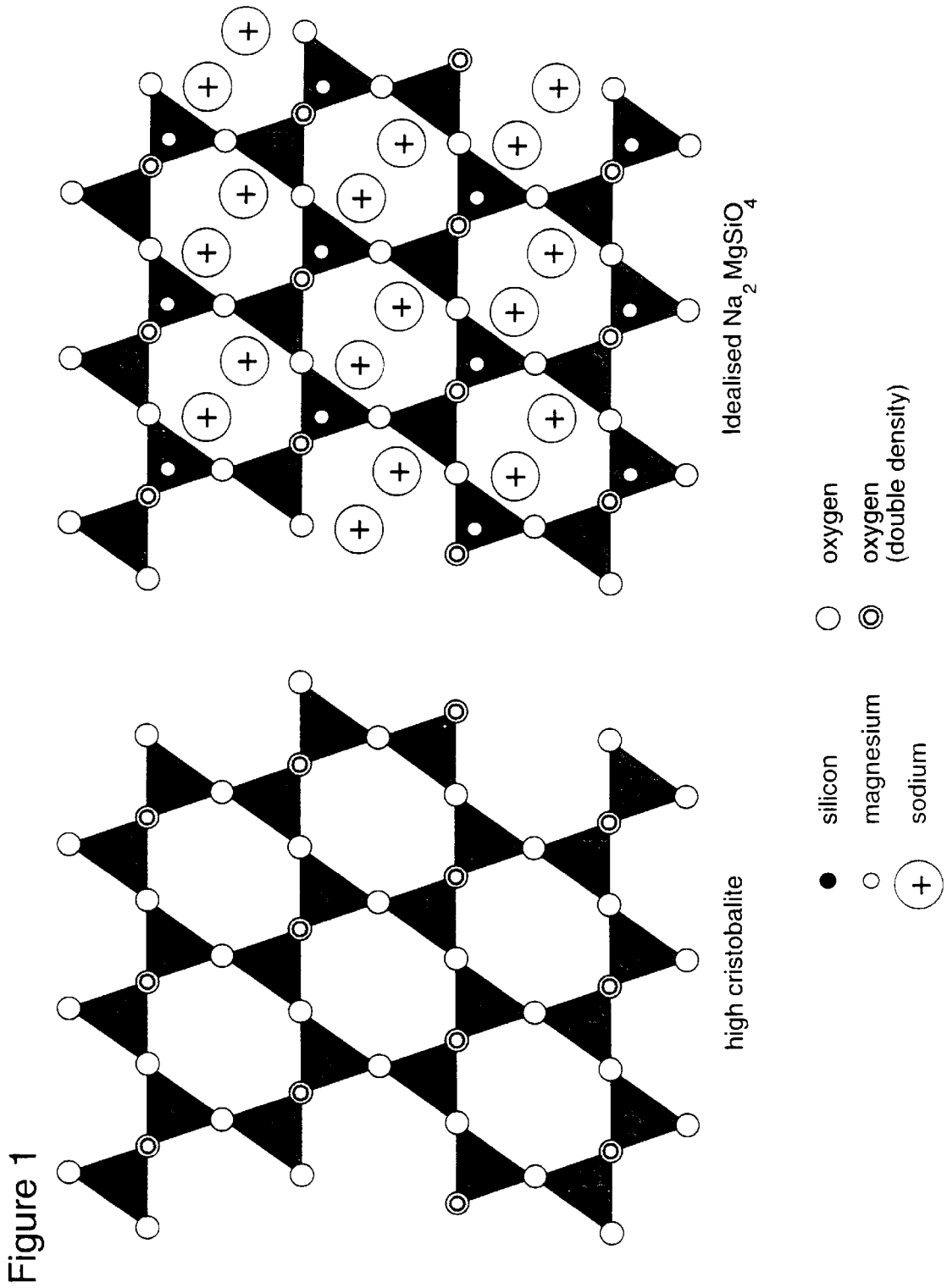
FIG. 1 shows polyhedral representations of high-cristobalite ($SiO_2$) and idealised $Na_2MgSiO_4$, projected down the cubic <110> direction.
Figure 2:
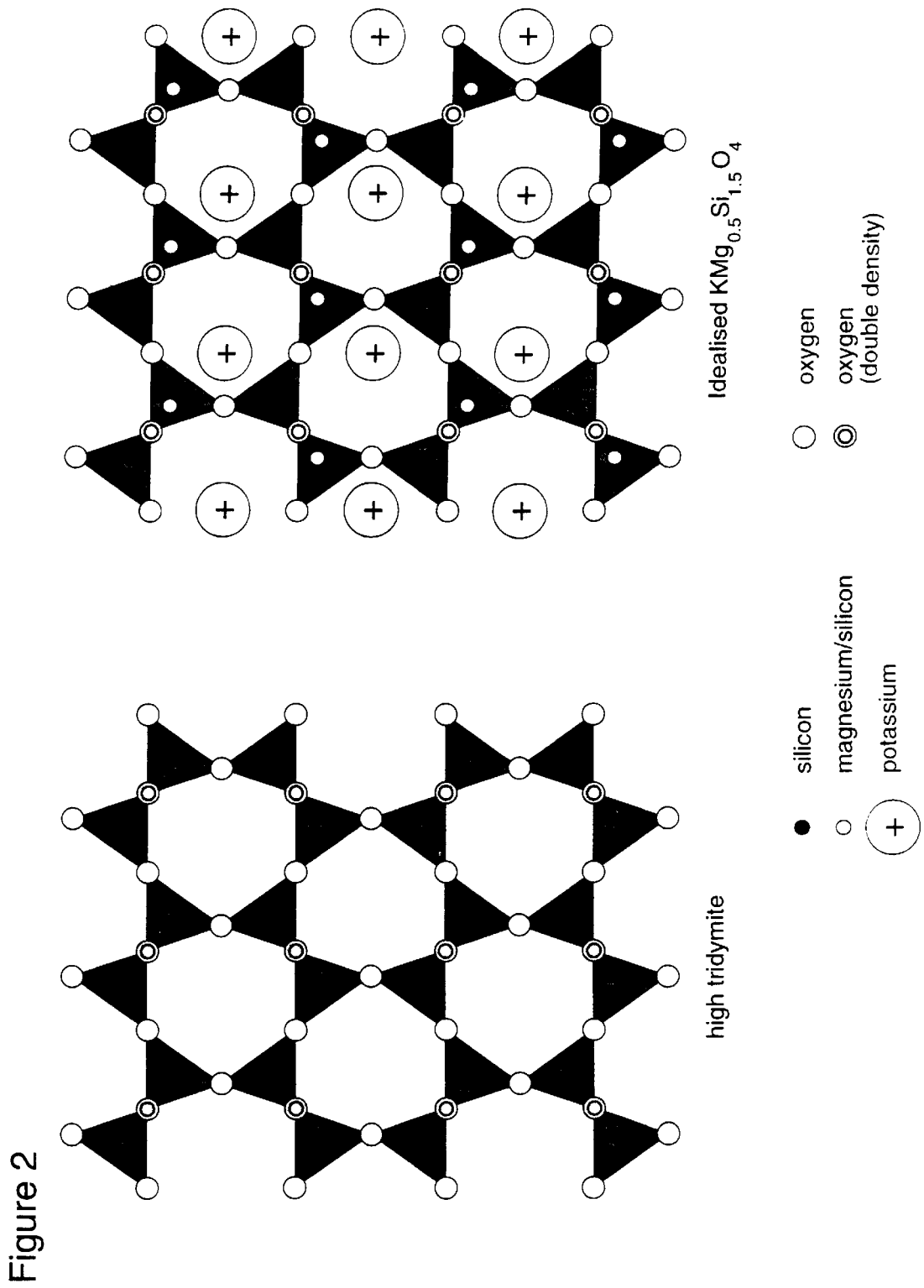
FIG. 2 shows polyhedral representations of high-tridymite ($SiO_2$) and idealised $KMg_{0.5}Si_{1.5}O_4$, projected down the <110> direction.

Peaks due to impurity minerals or reaction byproducts are indicated by asterisks.

DETAILED DESCRIPTION OF THE INVENTION

Structure and Composition of Magnesiosilicate Compounds in Accordance with the Invention and Having a Stuffed Silica Polymorph-related Structure Magnesiosilicate compounds having a stuffed silica polymorph-related structure can be characterised in terms of their structure and composition.

The structures of the various magnesiosilicate compounds having a stuffed silica polymorph-related structure are characterised most definitively by X-ray powder diffraction. When well prepared these compounds give X-ray powder diffraction profiles which display diffraction peaks characteristic of the stuffed silica polymorphs. Characteristic diffraction profiles for the various magnesiosilicates having a stuffed silica polymorph related structure can be seen in FIGS. 3 to 5 for compounds a–k of Examples 1 to 11 respectively. The corresponding tabulated information is given in Table 1.

Cristobalite-related sodium magnesiosilicates are characterised by the presence of dominant X-ray powder diffraction peaks or groups of peaks occurring simultaneously at a d-spacing of 4.30±0.15 Å and at a d-spacing of 2.64±0.22 Å. These peaks or groups of peaks are related to the 111 and 220 X-ray powder diffraction peaks, respectively, of high cristobalite.

Cristobalite-related potassium magnesiosilicates are characterised by the presence of a dominant X-ray powder diffraction peak or group of peaks occurring at a d-spacing of 2.73±0.15 Å and a weaker peak or group of peaks at a d-spacing of 4.44±0.10 Å. These peaks or groups of peaks are related to the 220 and 111 X-ray powder diffraction peaks, respectively, of high cristobalite.

Tridymite-related potassium magnesiosilicates are characterised by the presence of a dominant X-ray powder diffraction peak occurring at a d-spacing of 3.11±0.20 Å. This peak is related to the 202 X-ray powder diffraction peaks of high tridymite.

The XRD profiles observed for magnesiosilicates having a stuffed silica polymorph related structure are dependent on the choice of starting reagents and reaction conditions. They are also sometimes complicated by the presence of unreacted starting materials, reaction byproducts such as MgO or $Na_2SiO_3$ or impurity minerals, such as quartz, calcite, dolomite and feldspar, when naturally-occurring components are used.

Both these magnesiosilicate compounds and the magnesiosilicate compounds in accordance with the invention and having a layered structure described below can be further characterised by their composition.

In the broadest embodiment the subject magnesiosilicates have a composition range in anhydrous form given by $M_aMg_bAl_cSi_{1-(b+c)}O_d$, (M=alkali, optionally partially substituted by H or $NH_4$), where $0.0<a<2.0$, $0.0<b<0.7$, $0.0\leq c\leq 0.3$, and $1.15<d<3.0$. Also c<b. This general formula does not account for partial substitution of the tetrahedral atoms (Mg+Al+Si) by other elements T (where T=B, Be, Zn, Ga, Fe, Ge, As or P) which can occupy such positions in a tetrahedral framework structures. In the broadest embodiment T/(Mg+Al+Si)<0.1 and Mg>0. Neither does this general formula account for partial substitution of the interstitial atoms M by other elements A (where A=alkaline earth, transition metal or rare earth elements) which can occupy such interstitial sites in the structures. In the broadest embodiment A/M<0.2. Neither does the general formula account for impurity minerals or compounds which are not integrated into the structure, e.g. $TiO_2$-anatase, $SiO_2$-quartz.

In a more preferred embodiment the subject magnesiosilicates have a composition range in anhydrous form given by $M_aMg_bAl_cSi_{1-(b+c)}O_d$, where $0.4<a<1.4$, $0.2<b<0.6$, $0.0\leq c\leq 0.2$, $1.5<d<2.5$, and c<b. In this more preferred embodiment T/(Mg+Al+Si)<0.05, A/M<0.2 and Mg>0. Again, the general formula does not account for impurity minerals or compounds which are not integrated into the structure, e.g. $TiO_2$-anatase, $SiO_2$-quartz.

In the most preferred embodiment the subject magnesiosilicates have a composition range in anhydrous form given by $M_aMg_bAl_cSi_{1-(b+c)}O_d$, where $0.6<a<1.3$, $0.35<b<0.6$, $0.0\leq c\leq 0.1$, $1.65<d<2.25$, and c<b. In this most preferred embodiment Ti(Mg+Al+Si)<0.02, A/M<0.2 and Mg>0. Again, the general formula does not account for impurity minerals or compounds which are not integrated into the structure, e.g. $TiO_2$-anatase, $SiO_2$-quartz.

It is believed that unreacted reagent anions which may be used in the synthesis of magnesiosilicate cation exchange compounds, for example, carbonate, bicarbonate, nitrate, are also not integrated into the structures, and it is for this reason that they are not included in the empirical composition.

Composition analyses and derived formulae for magnesiosilicate compounds having silica polymorph-related structures and prepared according to Examples 1–11 are presented in Table 2.

TABLE 1

Relative intensities and d-spacings of characteristic diffraction peaks of stuffed silica polymorph magnesiosilicate compounds a–k of Examples 1–11

| Example No. | d | $I/I_o$ | d | $I/I_o$ | d | $I/I_o$ | d | $I/I_o$ | d | $I/I_o$ | d | $I/I_o$ |
|---|---|---|---|---|---|---|---|---|---|---|---|---|
| 1. | 4.24 | 100 | 2.65 | 50 | 2.59 | 70 | | | | | | |
| 2. | 4.23 | 100 | $2.62_{sh}$ | 40 | 2.59 | 80 | | | | | | |
| 3. | 4.23 | 20 | 2.72 | 100 | | | | | | | | |
| 4. | 3.12 | 100 | | | | | | | | | | |
| 5. | 4.26 | 90 | $2.70_{sh}$ | 50 | 2.66 | 100 | 2.58 | 80 | | | | |
| 6. | 4.24 | 100 | $2.70_{sh}$ | 40 | 2.65 | 80 | 2.59 | 80 | | | | |
| 7. | 4.24 | 100 | $2.69_{sh}$ | 50 | 2.64 | 90 | 2.59 | 80 | | | | |
| 8. | 4.24 | 100 | $2.70_{sh}$ | 50 | 2.64 | 90 | 2.58 | 100 | | | | |
| 9. | 4.24 | 100 | $2.66_{sh}$ | 30 | 2.59 | 80 | | | | | | |
| 10. | 4.32 | 50 | 4.24 | 40 | 2.72 | 50 | 2.64 | 100 | 2.59 | 60 | | |
| 11. | 4.45 | 20 | 4.31 | 20 | 3.08 | 15 | 2.73 | 100 | 2.64 | 30 | 2.58 | 25 | sh = shoulder on main diffraction peak

TABLE 2

Bulk anhydrous composition and derived formulae for subject magnesiosilicates (or Examples 1–11 determined by EDS

| | Example 1 wt % | Example 2 wt % | Example 3 wt % | Example 4 wt % | Example 5 wt % | Example 6 wt % | Example 7 wt % |
|---|---|---|---|---|---|---|---|
| $SiO_2$ | 38.0 | 50.7 | 34.3 | 58.5 | 40.5 | 36.5 | 38.9 |
| $TiO_2$ | 0.0† | 0.3 | 0.0† | 0.0† | 0.0† | 0.5 | 0.0† |
| $Al_2O_3$ | 4.4 | 5.3 | 3.3 | 0.3 | 2.5 | 3.8 | 4.4 |
| $Fe_2O_3$ | 1.1 | 2.3 | 2.4 | 0.0† | 0.0† | 0.0† | 0.9 |
| MgO | 21.7 | 25.1 | 15.1 | 14.3 | 21.9 | 21.2 | 22.1 |
| CaO | 0.0† | 1.1 | 0.5 | 0.0† | 0.5 | 0.4 | 0.3 |
| $Na_2O$ | 34.5 | 14.8 | 1.8 | 0.8 | 34.6 | 37.6 | 33.4 |
| $K_2O$ | 0.3 | 0.4 | 42.6 | 26.1 | 0.0† | 0.0† | 0.0† |
| a | 0.89 | 0.31 | 0.90 | 0.41 | 0.88 | 1.00 | 0.84 |
| b | 0.43 | 0.40 | 0.37 | 0.27 | 0.43 | 0.43 | 0.43 |
| c | 0.07 | 0.07 | 0.06 | 0.01 | 0.04 | 0.06 | 0.07 |
| d* | 1.98 | 1.72 | 2.05 | 1.93 | 1.99 | 2.04 | 1.96 |

| | Example 8 wt % | Example 9 wt % | Example 10 wt % | Example 11 wt % | Example 12 wt % | Example 13 wt % |
|---|---|---|---|---|---|---|
| $SiO_2$ | 36.5 | 49.4 | 33.7 | 27.5 | 43.1 | 46.4 |
| $TiO_2$ | 0.0† | 0.0† | 0.0† | 0.0† | 0.0† | 0.0† |
| $Al_2O_3$ | 3.9 | 5.5 | 0.0† | 2.0 | 5.6 | 6.0 |
| $Fe_2O_3$ | 0.0† | 1.5 | 4.1 | 0.8 | 0.9 | 0.0† |
| MgO | 22.1 | 29.9 | 26.8 | 14.8 | 28.5 | 26.5 |
| CaO | 0.3 | 0.4 | 0.6 | 0.0† | 0.5 | 0.7 |

TABLE 2-continued

|  | Bulk anhydrous composition and derived formulae for subject magnesiosilicates (or Examples 1–11 determined by EDS | | | | | |
|---|---|---|---|---|---|---|
| $Na_2O$ | 37.2 | 13.2 | 34.8 | 16.1 | 21.3 | 20.5 |
| $K_2O$ | 0.0† | 0.0† | 0.0† | 38.9 | 0.0† | 0.0† |
| a | 0.98 | 0.25 | 0.91 | 1.56 | 0.45 | 0.43 |
| b | 0.44 | 0.44 | 0.54 | 0.42 | 0.46 | 0.42 |
| c | 0.06 | 0.06 | 0.00 | 0.05 | 0.07 | 0.08 |
| d* | 2.02 | 1.66 | 1.92 | 2.34 | 1.73 | 1.76 |

*required by charge balance - not analysed
†set to zero as < 2σ

Synthesis of Magnesiosilicate Compounds in Accordance with the Invention and Having a Stuffed Silica Polymorph-related Structure Two general processes for the synthesis of the subject magnesiosilicate compounds having a stuffed silica polymorph-related structure are described.

1. The first process involves solid state reaction of alkali salt and magnesium-containing phyllosilicates. The range of conditions for the successful formation of these magnesiosilicate compounds by this process is dependent on the magnesium-containing phyllosilicate used.

While many alkali salts and alkali hydroxide and all magnesium-containing phyllosilicates are suitable as starting materials for this process, we exemplify the process using alkali carbonate and the phyllosilicate talc which are among the preferred starting materials.

In the first process the mole ratio of alkali carbonate ($M_2CO_3$) to the talc ($Mg_3Si_4O_{10}(OH)_2$) is from 0.1 to 4.5:1. The preferred mole ratio is in the range of 2 to 3:1.

Reaction is suitably carried out at an elevated temperature at atmospheric pressure for a sufficient period of time to enable conversion to a magnesiosilicate compound having a stuffed silica polymorph-related structure. Initially, the talc and alkali carbonate are intimately mixed then heated to between 450 and 800° C. until all the talc has reacted. At the lower end of the temperature range the likelihood of residual starting materials being present in the produce increases. The preferred conditions for this process are 550 to 700° C. for a period of between 0.5 and 24 hours. The resultant solid contains a magnesiosilicate compound with a stuffed silica polymorph related structure as the majority phase.

2. The second process involves solid state reaction of a reactive form of silica, a magnesium salt and an alkali salt, after the components have been mixed via a gel synthesis route.

The range of conditions for the successful formation of these magnesiosilicate compounds by this process is primarily dependent on the magnesium and alkali salts used.

While many magnesium and alkali salts and reactive forms of silica are suitable as starting materials for this process, we exemplify the process using alkali nitrate, magnesium nitrate and colloidal silica which are among the preferred starting materials.

In the second process, the mole ratios of colloidal silica (~$SiO_2$) to magnesium nitrate ($Mg(NO_3)_2$) to alkali nitrate ($MNO_3$) are typically about 1:1:2, but can vary substantially from this within the composition range described earlier. It is possible to replace the colloidal silica by other forms of silica such as soluble alkali silicate.

Reaction takes place by dissolving the magnesium and alkali nitrate in a small amount of water, then adding the colloidal silica to the dissolved salts. The reaction mixture is homogenised, then the water is evaporated slowly, giving a gel. This gel is then further reacted at elevated temperature and atmospheric pressure for a sufficient period of time to enable conversion to magnesiosilicate compounds having a stuffed silica polymorph-related structure in accordance with the invention. The gel is heated to between 450° C. and 800° C. until magnesiosilicate compound having a stuffed silica polymorph related structure is observable by XRD. The preferred conditions for this process are 550° C. to 700° C. for a period of between 2 days and 6 hours.

Examples of Specific Conditions of Synthesis of Magnesiosilicate Compounds in Accordance with the Invention and Having a Stuffed Silica Polymorph-related Structure Examples of the specific conditions of synthesis under which the components react together to give magnesiosilicates having a stuffed silica polymorph related structure are given below.

Figure 3:
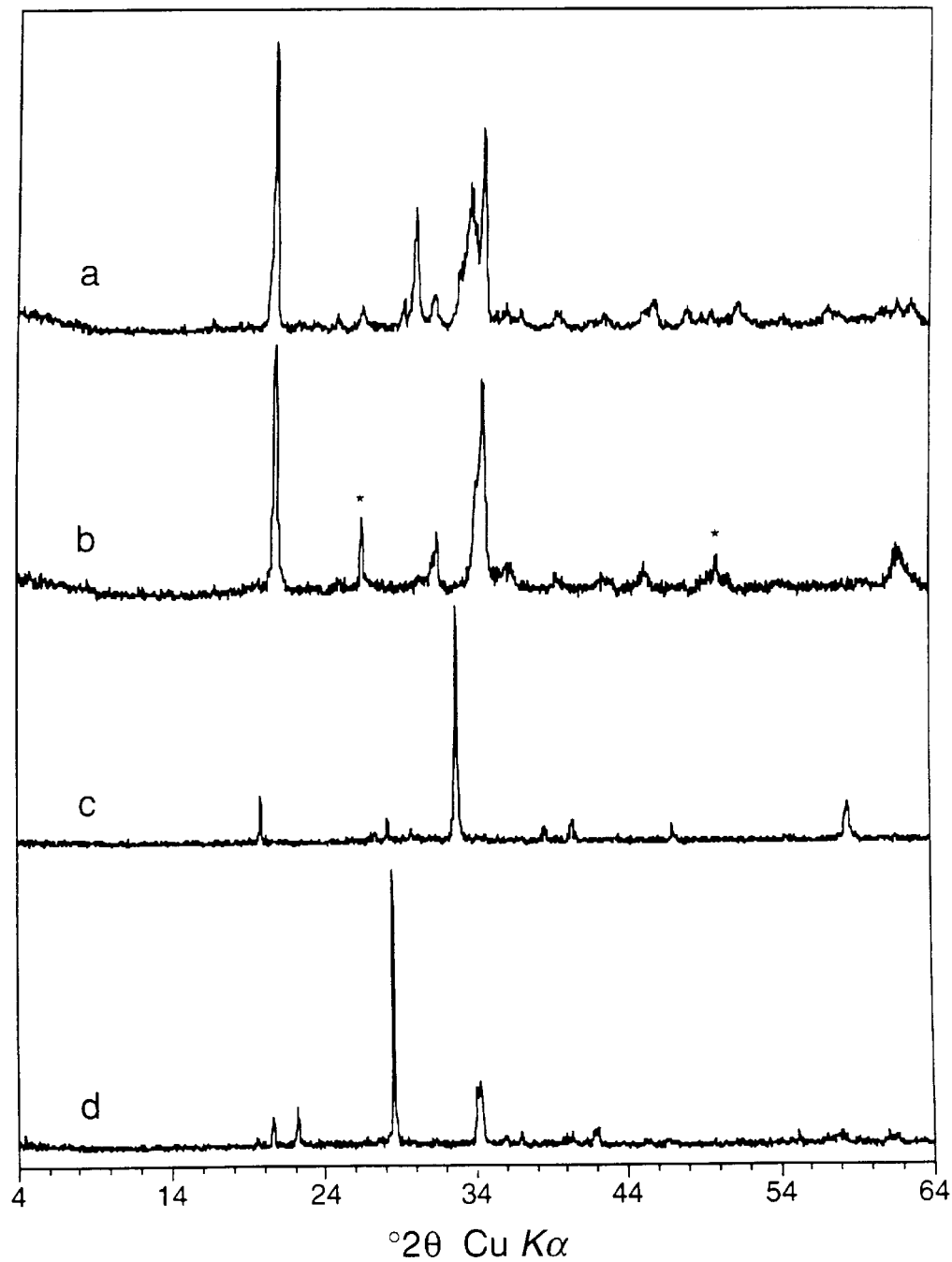
FIGS. 3 to 6 show XRD profiles of the subject magnesiosilicate compounds a–m prepared according to Examples 1–13 respectively. XRD data were collected using CuKα radiation.

1. 200 g of ≦25 μm talc is dispersed in 0.53 liters of water. A solution containing 170 g of commercial grade $Na_2CO_3$ in 0.50 liters of water is slowly added and the resultant slurry stirred vigorously for 20 minutes. This slurry is then dehydrated using a spray drier with an inlet temperature of 250° C. The spray dried reaction mixture is then heated at 600° C. for 16 hours. The XRD profile of this material, which has a cristobalite-related structure, is shown in FIG. 3 (compound a).

2. 500 g of saponite from Watheroo, Western Australia, is dispersed in 2.0 liters of water A solution containing 330 g of commercial grade $Na_2CO_3$ in 0.75 liters of water is slowly added and the resultant slurry stirred vigorously for 20 minutes. This slurry is then dehydrated using a spray drier with an inlet temperature of 250° C. The spray dried reaction mixture is then heated at 550° C. for 3.5 hours. The profile of this material which has a cristobalite-related structure is shown in FIG. 3 (compound b).

3. 5.737 g of potassium nitrate is dissolved in 5 ml of water at 50° C. This solution is added to 5 g of saponite from Watheroo, Western Australia, and thoroughly homogenised using a mortar and pestle then dehydrated at 100° C. The reaction mixture is then heated at 600° C. for 21 hours. The XRD profile of this material which has a simple cubic cristobalite-related structure is shown in FIG. 3 (compound c).

4. 3.214 g of potassium nitrate and 4.07 g of magnesium nitrate hexahydrate are dissolved in 10 ml of water at 50° C. This solution is added to 8.98 g of Ludox AM (du Pont) colloidal silica (31.9 wt % $SiO_2$). A gel forms immediately upon mixing which is then dehydrated at 130° C. The dry mixture is then heated to 800° C. for 2 days. The XRD profile of this material which has a tridymite-related structure is shown in FIG. 3 (compound d).

Figure 4:
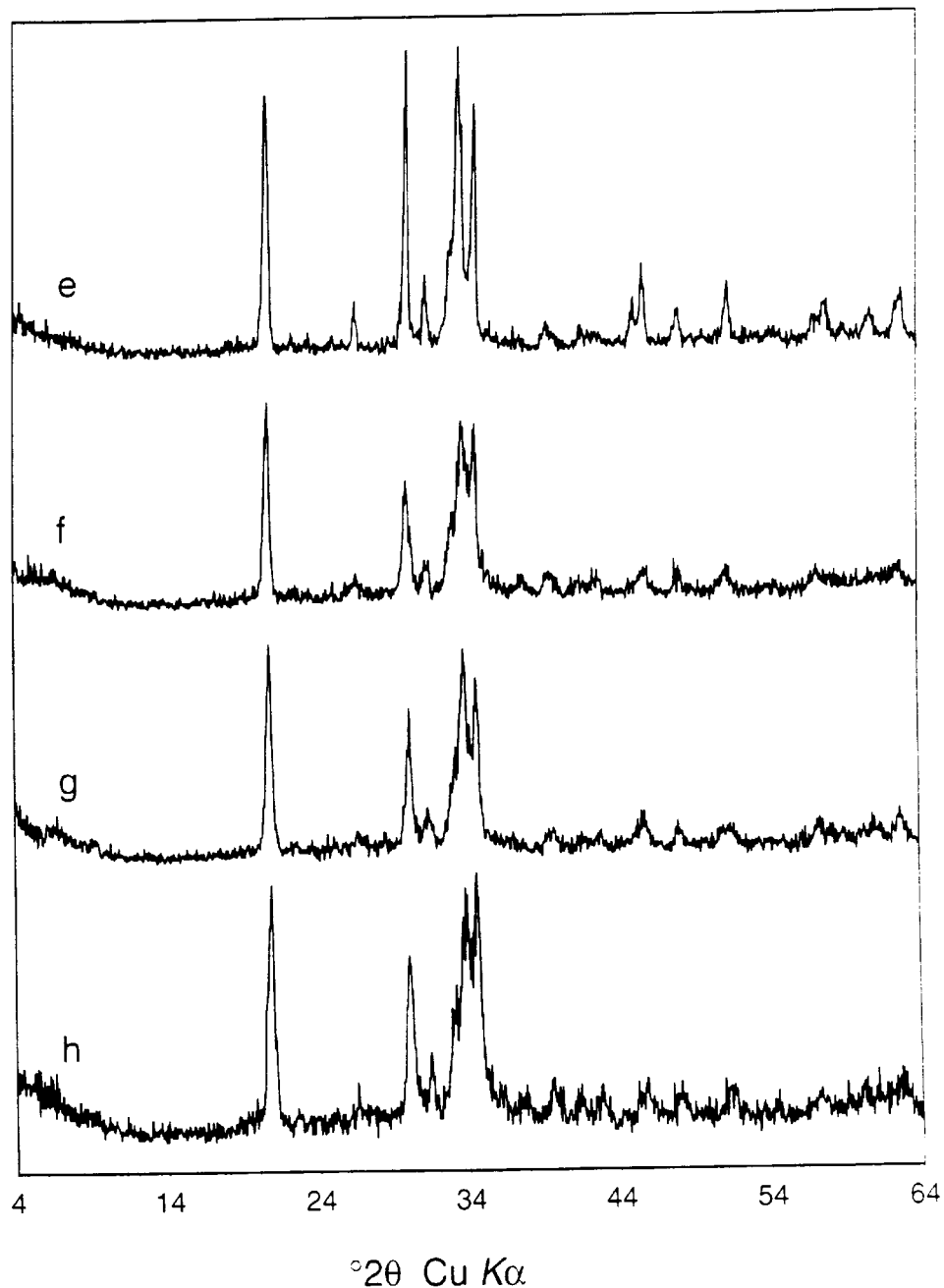

5. Material was prepared as for Example 1 except that a ≦20 μm talc was used as starting material. The XRD profile of this material, which has a cristobalite-related structure, is shown in FIG. 4 (compound e).

6. 200 g of partly delaminated talc, with specific surface of 18 $m^2g^{-1}$, is dispersed in 0.6 liters of water. A solution containing 170 g of commercial grade $Na_2CO_3$ in 0.60 liters of water is slowly added and the resultant slurry stirred vigorously for minutes. This slurry is then dehydrated using a spray drier with an inlet temperature of 275° C. The spray dried reaction mixture is then heated at 550° C. for 16 hours. The XRD profile of this material, which has a cristobalite-related structure, is shown in FIG. 4 (compound f).

7. 100 g of partly delaminated talc, with specific surface of 18 $m^2g^{-1}$, is dispersed in 0.3 liters of water. A solution containing 68 g of commercial grade $Na_2CO_3$ in 0.24 liters of water is slowly added and the resultant slurry stirred vigorously for minutes. This slurry is then dehydrated using a spray drier with an inlet temperature of 275° C. The spray dried reaction mixture is then heated at 550° C. for 16 hours. The XRD profile of this material, which has a cristobalite-related structure, is shown in FIG. 4 (compound g).

8. 120 g of ball milled talc, with specific surface of 45 $m^2g^{-1}$, is dispersed in 0.36 liters of water. A solution containing 102 g of commercial grade $Na_2CO_3$ in 0.36 liters of water is slowly added and the resultant slurry stirred vigorously for 20 minutes. This slurry is then dehydrated using a spray drier with an inlet temperature of 275° C. The spray dried reaction mixture is then heated at 550° C. for 16 hours. The XRD) profile of this material, which has a cristobalite-related structure, is shown in FIG. 4 (compound h).

9. 200 g of ≦25 μm talc is dispersed in 0.5 liters of water. A solution containing 85 g of commercial grade $Na_2CO_3$ in 0.25 liters of water is slowly added and the resultant slurry stirred vigorously for 20 minutes. This slurry is then dehydrated using a spray drier with an inlet temperature of 250° C. The spray dried reaction mixture is then heated at 600° C. for 16 hours. The XRD profile of the reaction product contains a mixture of cristobalite-related structures and a small quantity of unreacted talc, shown in FIG. 5 (compound i)

Figure 5:
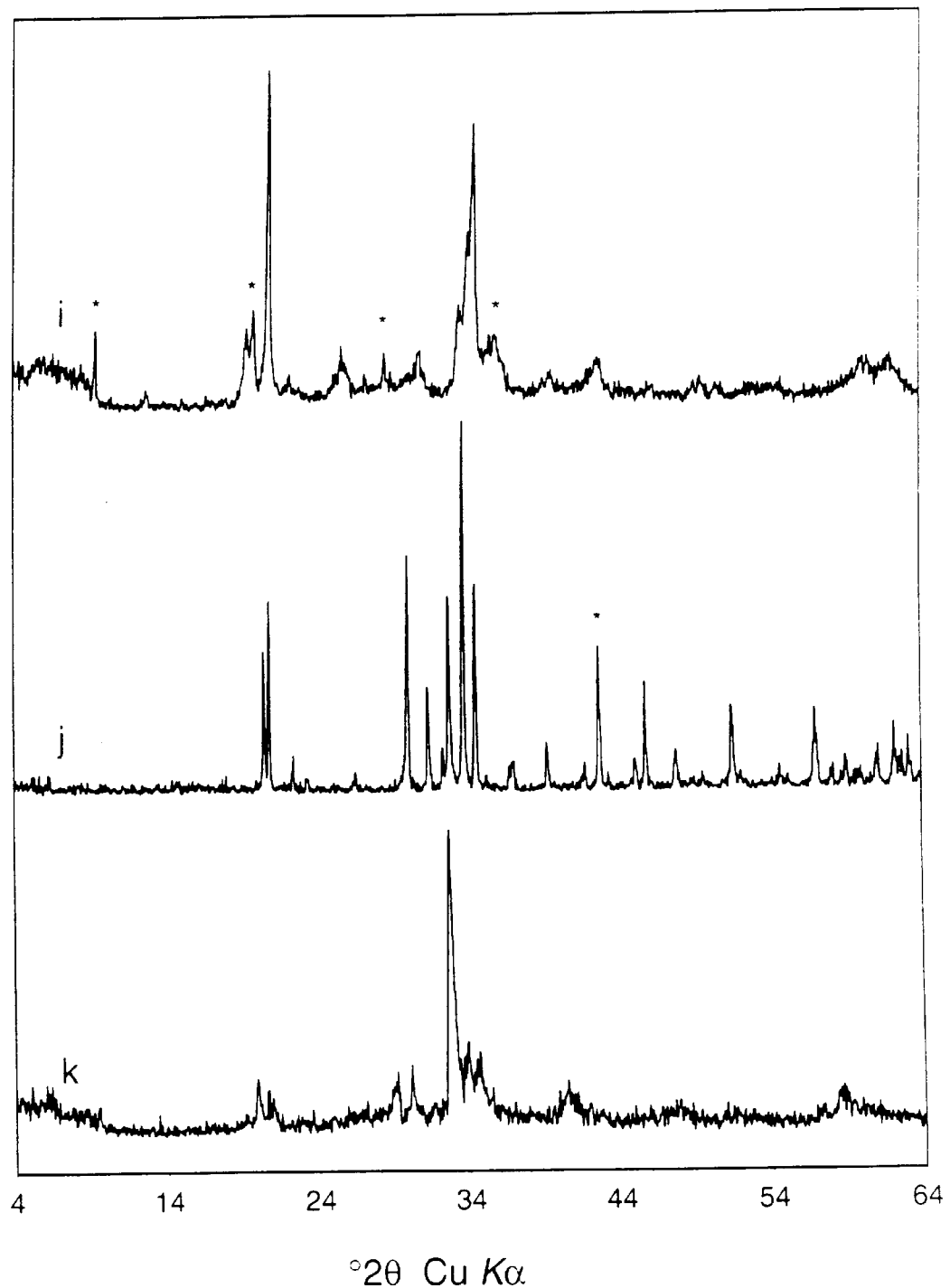

10. 0.5 g of chrysotile, with nominal composition $Mg_3Si_2O_5(OH)_4$, is reacted with 0.6 g of sodium carbonate by thoroughly grinding the solids together then reacting the mixture at 500° C. for 16 hours. The reaction product is then reground and reacted at 650° for 4 days, then at 800° C. for a further 4 days. The XRD profile of the reaction product which shows a cristobalite-related structure as the main phase, as well as some MgO, is shown in FIG. 5 (compound j).

11. 100 g of partly delaminated talc, with specific surface of 18 $m^2g^{-1}$, is dispersed in 0.3 liters of water. A solution containing 42.5 g of commercial grade $Na_2CO_3$ and 66.2 g of commerical grade $K_2CO_3.1.5H_2O$ in 0.24 liters of water is slowly added and the resultant slurry stirred vigorously for 20 minutes. This slurry is then dehydrated using a spray drier with an inlet temperature of 275° C. The spray dried reaction mixture is then hated at 500° C. for 16 hours. The XRD profile of this material, which has a cristobalite-related structure, is shown in FIG. 5 (compound k).

Structure and Composition of Magnesiosilicate Compounds in Accordance with the Invention Having the Layered Structure The structures of these magnesiosilicate compounds having a layered structure are characterised most definitively by X-ray powder diffraction. When well prepared they give X-ray powder diffraction profiles which display a characteristic broad diffraction peak corresponding to a d-spacing of between 11 and 17 Å. Examples of characteristic diffraction profiles for these compounds can be seen in FIG. 6 for compounds 1 and m of Examples 12 and 13 respectively. Preferably, the characteristic broad diffraction peak corresponds to a d-spacing of between 12 and 16 Å.

The compositions of these magnesiosilicate compounds in accordance with the invention having the layered structure are as described above for the magnesiosilicate compounds having a stuffed silica polymorph-related structure.

Composition analyses and derived formulae for magnesiosilicate compounds 1 and m having the layered structure and prepared according to Example 12 and 13 respectively are presented in Table 2.

Synthesis of Magnesiosilicate Compounds in Accordance with the Invention and Having the Layered Structure Two general processes for the synthesis of the subject magnesiosilicate compounds having the layered structure are described.

1. The first process comprises treating a magnesiosilicate compound with a stuffed silica polymorph structure with water, whereby the starting compound is dispersed in water for a time, the remaining solid then being separated by centrifuge or by filtration from the supernatant liquid then dried.

The preferred duration of this treatment is less than about 20 minutes, and preferably less than about 10 minutes, with the drying of the resultant solid product taking place at less than about 100° C., and preferably less than about 60° C.

The water used in rinsing may be distilled water or it may be water containing small or large amounts of dissolved species, such as an $Na^+$-containing solution. The rinsing process leads to a change in composition relative to the starting material such that the Na/Mg ratio is reduced significantly and the Si/Mg ratio is reduced slightly. However, the resulting composition remains within the broad composition described above.

2. The second process comprises subjecting a magnesiosilicate material starting material, or a combination of magnesium oxide- and silicon oxide-containing reagents, to aqueous reaction with an alkali oxide-containing reagent.

The reaction is performed at a temperature between 100 and 300° C. in a sealed vessel, and preferably between 150 and 200° C.

The alkali oxide-containing reagent preferably decomposes in air at a temperature below about 1000° C. to give alkali oxide, and is more preferably selected from one or more of the group bicarbonate, carbonate, carboxylate, nitrate and hydroxide.

A preferred embodiment of the process is where the magnesiosilicate starting material comprises a phyllosilicate mineral, and more preferably where the phyllosilicate mineral is talc or saponite.

Examples of Specific Conditions of Synthesis of Magnesiosilicate Compounds in Accordance with the Invention and Having the Layered Structure An example of the first process for the synthesis of the magnesiosilicate compounds having the layered structure is given below.

EXAMPLE 12

Figure 6:
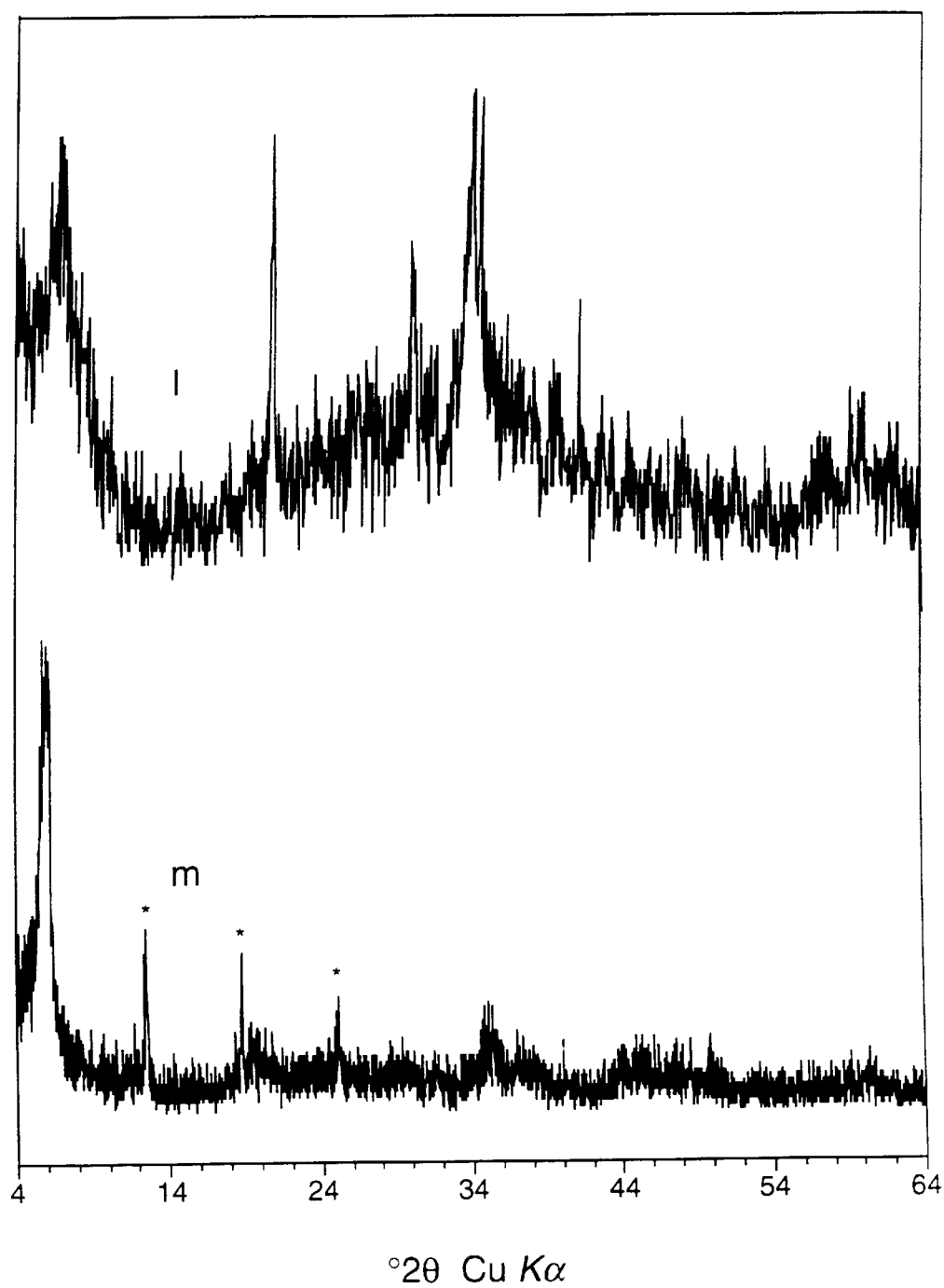

1.0 g of the material prepared according to Example 6 is dispersed in 40 ml of distilled water and then centrifuged to separate the solid from the supernatant liquid, the full procedure taking about 10 minutes. The solid is then dried at 40° C., yielding 0.82 g of white powder. The XRD profile of the magnesiosilicate compound, which shows a dominant, broad peak at a d-spacing of ~12.5 Å and remnant peaks due to the stuffed silica polymorph related structure of the starting material, is shown in FIG. 6 (compound l).

An example of the second process for the synthesis of the magnesiosilicate compounds having the layered structure is given below.

EXAMPLE 13

1.483 g of NaOH is dissolved in 3 ml of water followed by the addition of 3.703 g of sodium silicate solution. The combined solution is then added to 1.264 g of talc in a mortar and pestle and thoroughly ground, producing a thick slurry. This slurry is then placed in a teflon-lined sealed pressure vessel and heated at 185–190° C. for 1 week. The resultant solid is then removed from the vessel and rinsed with ~50 ml of water. The solid is then dried at 40° C. The XRD profile of the magnesiosilicate compound, which shows a dominant, broad peak at a d-spacing of ~15.0 Å and remnant sharp peaks due to unreacted chlorite from the starting material, is shown in FIG. 6 (compound m).

Preparation of a Monolithic Body

For some applications of the magnesiosilicate compounds in accordance with the invention, particularly for use as a water softener, it may be desirable to prepare a monolithic body. This can be achieved for those compound formed by the solid state reaction route by pressing the dry reaction mixture into its desired form prior to the solid state reaction. A robust, porous body can be produced in this manner. A binder may be included to further enhance the robustness of the body.

One Embodiment of Such a Process is Described in Example 14

EXAMPLE 14

1 g of spray dried reaction mixture described in Example 1 is pressed into a monolithic form using a uniaxial press at a pressure of 2000 kgcm$^{-2}$ for 3 minutes. The resultant pellet is then reacted at 650° C. for 16 hours, producing a robust pellet with 52% of theoretical density.

Calcium Binding Capacity

For the purposes of the present invention two different methods were used to determine calcium binding capacity (CBC). Calcium binding capacity is measured as milligrams of CaO taken up per gram of the magnesiosilicate compound at room temperature.

Method A

To characterise the magnesiosilicate compounds in accordance with their proposed utility as water softeners or detergent builders, a method similar to that described in GB 1 473 201 (Henkel) and EP 0 384 070 A2 (Unilever) was used. In this test 0.1 g of test compound was dispersed in 100 ml of 10 an aqueous solution containing 202 ppm of $Ca^{2+}$, and where necessary, adjusted to a pH of with dilute NaOH. The suspension was stirred at 20° C. for 15 minutes, then centrifuged to remove the solid. The aqueous solution was then tested for residual $Ca^{2+}$ using a calcium-selective electrode.

Various examples of the subject magnesiosilicate compounds and, for comparison, other commercially produced detergent builders were tested. The results of these tests are given in Table 3 below. All of the magnesiosilicate compounds of Examples 1 to 14 above have a CBC of greater than 10 mg CaO at room temperature.

TABLE 3

Residual $Ca^{2+}$ concentration and derived CBC using Method A*

| Material | $Ca^{2+}$ conc. (ppm) | Derived CBC (mg CaO/g) |
| --- | --- | --- |
| Example 1 | 133.6 | 96.0 |
| Example 5 | 133.6 | 96.0 |
| Example 6 | 81.3 | 169.2 |
| Example 7 | 96.3 | 145.4 |
| Example 8 | 84.0 | 165.4 |
| Zeolite P (EP 0 565 364 A1) | 81.3 | 169.2 |
| Zeolite 4A (Wessalith P, Degussa) | 92.8 | 153.1 |
| Zeolite 4A (Valfor, PQ Corp.) | 78.0 | 173.9 |
| SKS-6 (Hoechst) | 66.7 | 186.9 |

*Initial $Ca^{2+}$ concentration of 202.2 ppm, equivalent to 282.9 mg CaO/g at loading of 0.1 g per 100 ml.

Method B

Calcium binding capacities were also compared in the presence of background 0.01 M Na$^+$ in a manner similar to the method described in EP 0 384 070 A2 (Unilever) for the purpose of more closely simulating a wash liquor environment. In this test 0.1 g of compound was dispersed in 100 ml of an 0.01 M NaCl solution containing 202 ppm of $Ca^{2+}$, and where necessary, adjusted to a pH of 10 with dilute NaOH. The suspension was stirred at 20° C. for 15 minutes, then centriged to remove the solid. The aqueous solution was then tested for residual $Ca^{2+}$ using a calcium-selective electrode.

Various examples of the subject magnesiosilicate compounds and, for comparison, other commercially produced detergent builders were tested. The results of these tests are given in Table 4 below.

TABLE 4

Residual $Ca^{2+}$ concentration and derived CBC using Method B*

| Material | $Ca^{2+}$ conc. (ppm) | Derived CBC (mg CaO/g) |
| --- | --- | --- |
| Example 1 | 131.2 | 99.2 |
| Example 5 | 121.1 | 113.4 |
| Example 6 | 65.9 | 190.5 |
| Example 7 | 102.6 | 136.6 |
| Example 8 | 73.8 | 179.5 |
| Zeolite P (EP 0 565 364 A1) | 91.7 | 154.4 |
| Zeolite 4A (Wessalith P, Degussa) | 86.3 | 162.0 |
| Zeolite 4A (Valfor, PQ Corp.) | 100.0 | 142.8 |
| SKS-6 (Hoechst) | 83.4 | 163.5 |

*Initial $Ca^{2+}$ concentration of 202.2 ppm, equivalent to 282.9 mg CaO/g at loading of 0.1 g per 100 ml.

Magnesium Binding Capacity

Magnesium binding capacity is measured as milligrams of MgO taken up per gram of the magnesiosilicate compound at room temperature.

Method C

To characterise the magnesiosilicate compounds further in accordance with their proposed utility as water softeners or detergent builders, a method C similar to Method A described above was used to measure magnesium binding capacity (MBC). In this test 0.1 g of test compound was dispersed in 100 ml of an aqueous solution containing 200 ppm of $Mg^{2+}$ and, where necessary, adjusted to a pH of 10 with dilute NaOH. The suspension was stirred at 20° C. for 15 minutes, then centrifuged to remove the solid. The aqueous solution was then tested for residual $Mg^{2+}$ using atomic absorption spectroscopy.

Various examples of the subject magnesiosilicate compounds and, for comparison, other commercially produced detergent builders were tested. The results of these tests are given in Table 5 below. All of the magnesiosilicate compounds of Examples 1 to 14 above have an MCB of greater than 10 mg MgO at room temperature.

TABLE 5

Residual $Mg^{2+}$ concentration and derived MBC using Method C

| Material | $Mg^{2+}$ conc. (ppm) | Derived MBC (mg MgO/g) |
|---|---|---|
| Example 1 | 168 | 53.1 |
| Example 5 | 167 | 54.7 |
| Example 6 | 112 | 145.9 |
| Example 7 | 102 | 162.5 |
| Example 8 | 82 | 195.7 |
| Zeolite P (EP 0 565 364 A1) | 198 | 3.3 |
| Zeolite 4A (Wessalith P, Degussa) | 174 | 43.1 |
| Zeolite 4A (Valfor, PQ Corp.) | 178 | 36.5 |
| SKS-6 (Hoechst) | 77 | 204.0 |

*Initial $Mg^{2+}$ concentration of 200 ppm, equivalent to 331.7 mg MgO/g at loading of 0.1 g per 100 ml.

Calcium Binding Rate (CBR)

Calcium binding rate is measured as the time taken to remove half of the $Ca^{2+}$ from approximately a 100 ppm $Ca^{2-}$ solution at room temperature at a loading of 3 g of the magnesiosilicate compound per liter.

Method D

The subject magnesiosilicate compound are further characterised in terms of their calcium binding rate (CBR) in accordance with their utility as water softeners or detergent builders To quantify the rate at which $Ca^{2+}$ is removed from solution, using method D, 0.15 g of test compound is dispersed in ~1 ml of water which is then injected into 50 ml of stirred solution containing 0.01 M NaCl, 0.1 M KCl and ~100 ppm of $Ca^{2-}$ concentration of the stirred solution is measured as a function of time using a calcium selective electrode.

Various examples of the subject magnesiosilicate compounds and, for comparison, other commerically produced detergent builders were tested. The results of these test are given in table (6). All of the magnesiosilicate compounds of Examples 1 to 13 above have a CBR of less than 300 seconds at room temperature.

TABLE 6

Calcium binding rate according to Method D.

| Material | Time (seconds)† |
|---|---|
| Example 1 | 5.0 |
| Example 2 | 270 |
| Example 5 | 4.5 |
| Example 6 | 1.5 |
| Example 7 | 10.0 |
| Example 8 | 2.5 |
| Example 11 | 12.0 |
| Example 12 | 9.5 |
| Zeolite P (EP 0 565 364 A1) | 14.5 |
| Zeolite 4A (Wessalith P, Degussa) | 11.5 |
| Zeolite 4A (Valfor, PQ Corp.) | 11.5 |
| SKS-6* (Hoechst) | 250 |

† time to remove half of the $Ca^{2+}$ from solution.
*material added dry due to inability to disperse in 1 ml of water Oil Absorption (OA)

Oil absorption was determined by the ASTM spatula rub-out method D281 as also used in EP 0 565 364 A1. This test is based on the principle of mixing linseed oil with the particulate material by rubbing with a spatula on a smooth surface until a stiff putty-like paste is formed which will not break or separate when it is cut with a spatula. The Oil Absorption (OA) is expressed in grams of oil per 100 g of dry material.

Various examples of the subject magnesiosilicate compounds and, for comparison, other commercially produced detergent builders were tested. The results of these tests are given in Table 7 below.

TABLE 7

Oil Absorption results using ASTM method D281.

| Sample | OA | Sample | OA |
|---|---|---|---|
| Example 1 | 60–92 | Zeolite P (EP 0 565 364 A1) | 63–77 |
| Example 5 | 102 | Zeolite 4A (Valfor, PQ Corp.) | 36–43 |
| Example 6 | 107–113 | Zeolite 4A (Wessalith P, Degussa) | 60 |
| Example 7 | 107 | SKS-6 (Hoechst) | 95 |
| Example 8 | 77 | | |
| Example 11 | 154 | | |

Use in Detergent Formulation

One example of the subject magnesiosilicate compounds was tested for its utility as a detergent builder in comparison with the commercially used materials, Zeolite 4A and sodium tripolyphosphate (STPP). The three formulations tested are given in Table 8 below.

Other formulations incorporating the subject magnesiosilicate compounds may be adopted for detergent compositions as will be readily understood by those skilled in the detergency art. By way of example only, we direct reference to the discussion on detergent compositions in EP-A-0384070 and its United States equivalent (which are incorporated herein by reference) which applies mutatis mutandis to detergent compositions incorporating the subject magnesiosilicate compounds.

TABLE 8

Laundry detergent formulations used in comparative swatch tests.

| | Formulation A STPP built | Formulation B Zeolite 4A built | Formulation C Ex. 1 built |
|---|---|---|---|
| Sodium tripolyphosphate | 15.0% | | |
| Zeolite 4A | | 18.0% | |
| Magnesiosilicate Ex. 1 | | | 18.0% |
| Dense soda ash | 25.0% | 24.0% | 5.3% |
| Sodium sulphate | 31.4% | 29.4% | 48.1% |
| Coconut diethanalamide 1:1 | 2.5% | 2.5% | 2.5% |
| Sodium dodecyl benzene suphonate | 15.0% | 15.0% | 15.0% |
| Sodium metasilicate (DMS) | 10.0% | 10.0% | 10.0% |
| bis(triazinylamino) stilbene di sulphonic acid der. | 0.1% | 0.1% | 0.1% |

Comparative Laundry Swatch Test Results

The comparative tests described below used a FOM 71 LAB front loading 7 kg capacity washer-extractor. The three formulations as listed in Table 8 were dosed at 8 g/L with liters of water per wash.

The two swatches used were EMPA 105, which contained five regions (white, carbon black/oil, blood, chocolate & milk, red wine) and white cotton.

Each of the two swatches was washed separately with each of the three formulations A to C under four sets of conditions as follows:

1. Soft water (17 mg/L CaCO$_3$) at 20° C.
2. Hard water (135 mg/L CaCO$_3$) at 20° C.
3. Soft water (17 mg/L CaCO$_3$) at 60° C.
4. Hard water (135 mg/L CaCO$_3$) at 60° C.

Comparative results are listed in Tables 9 to 12 below giving visual estimation of the colour of each region on each swatch and a ranking of performance.

TABLE 9

Soft water (17 mg/L CaCO$_3$) at 20° C.

| | EMPA 105 | | | | | White Cotton | |
|---|---|---|---|---|---|---|---|
| EMPA 105 Swatch No. | White | Carbon Black/Oil | Blood | Chocolate & Milk | Red Wine | WHITE Swatch No. | |
| Formulation A | 1 white | = 1 grey | 1 pale yellow | 1 pale fawn/ brown | 1 pale fawn | Formulation A | 1 white |
| Formulation B | = 2 pale cream | = 1 grey | 3 deeper yellow | 2 pale fawn/ brown | 2 pale fawn | Formulation B | 2 slightly duller white |
| Formulation C | = 2 pale cream | 2 mid grey | 2 yellow | 3 darker brown | 3 slightly darker fawn | Formulation C | 3 duller white |
| Unwashed blank | Dull white | Pantone 423U slate grey | Pantone 4635U dark brown | Pantone 728U coffee brown | Pantone 4755U fawn brown | Unwashed blank | white |

TABLE 10

Hard water (135 mg/L CaCO$_3$) at 20° C.

| | EMPA 105 | | | | | White Cotton | |
|---|---|---|---|---|---|---|---|
| EMPA 105 Swatch No. | White | Carbon Black/Oil | Blood | Chocolate & Milk | Red Wine | WHITE Swatch No. | |
| Formulation A | 1 white | 1 pale grey | 1 pale cream | 1 pale fawn/brown | 1 pale fawn | Formulation A | 3 dull white |
| Formulation B | 3 off white | 3 pale grey | 3 deep cream | 2 chocolate brown | 2 pale fawn | Formulation B | 1 white |
| Formulation C | 2 off white | 2 pale grey | 2 dark cream | 3 chocolate brown | 3 darker fawn | Formulation C | 2 white |
| Unwashed blank | Dull white | Pantone 423U slate grey | Pantone 4635U dark brown | Pantone 728U coffee brown | Pantone 4755U fawn brown | Unwashed blank | white |

TABLE 11

Soft water (17 mg/L CaCO$_3$) at 60° C.

| | EMPA 105 | | | | | White Cotton | |
|---|---|---|---|---|---|---|---|
| EMPA 105 Swatch No. | White | Carbon Black/Oil | Blood | Chocolate & Milk | Red Wine | WHITE Swatch No. | |
| Formulation A | 1 white | 1 pale grey | 2 pale fawn | 2 red brown | 1 pale fawn | Formulation A | 1 slightly off white |
| Formulation B | 3 cream | 2 grey | 3 fawn | 1 pale brown | 2 sandy | Formulation B | = 2 off white |
| Formulation C | 2 cream | 3 darker grey | 1 pale fawn | 3 darker brown | 3 brown | Formulation C | = 2 off white |
| Unwashed blank | Dull white | Pantone 423U slate grey | Pantone 4635U dark brown | Pantone 728U coffee brown | Pantone 4755U fawn brown | Unwashed blank | white |

TABLE 12

Hard water (135 mg/L CaCO$_3$) at 60° C.

| | EMPA 105 | | | | | White Cotton | |
|---|---|---|---|---|---|---|---|
| EMPA 105 Swatch No. | White | Carbon Black/Oil | Blood | Chocolate & Milk | Red Wine | WHITE Swatch No. | |
| Formulation A | = 1 white | 1 pale grey | 1 pale fawn | 1 pink ochre | 1 pale fawn | Formulation A | = 1 white |
| Formulation B | = 1 white | 2 pale grey | 2 pale fawn | 2 pink ochre | 2 sandy | Formulation B | 2 off white |
| Formulation C | 2 cream | 3 dark grey | 3 dark khaki | 3 chocolate brown | 3 dark sand | Formulation C | = 1 white |
| Unwashed blank | Dull white | Pantone 423U slate grey | Pantone 4635U dark brown | Pantone 728U coffee brown | Pantone 4755U fawn brown | Unwashed blank | white |

These comparative results demonstrate that the subject magnesiosilicates compare well with Na zeolite A and therefore have utility as phosphate-free detergent builders.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

We claim:

1. A magnesiosilicate compound having a calcium binding capacity (CBC) of at least mg CaO per gram at room temperature, a magnesium binding capacity (MBC) of at least mg MgO per gram at room temperature, a calcium binding rate (CBR) of no more than 300 seconds at room temperature, being the time taken to remove half of the Ca$^{2+}$ from a ~100 ppm Ca$^{2+}$ solution at a loading of 3 g per liter, and having a stuffed silica polymorph-related structure.

2. A magnesiosilicate compound according to claim 1 which has a composition in anhydrous form given by $M_aMg_bAl_cSi_{1-(b+c)}O_d$, where M=alkali, optionally partially substituted by H or NH$_4$; where 0.0<a<2.0, 0.0<b<0.7, 0.0≦c≦0.3, and 1.15<d<3.0; where c<b; where there may be partial substitution of the atoms (Mg+Al+Si) by one or more other elements T selected from the group B, Be, Zn, Ga, Fe, Ge, As and P such that T/(Mg+Al+Si)<0.1 and Mg>0; where there may be partial substitution of the interstitial atoms M by one or more other elements A selected from the group alkaline earth, transition metal and rare earth elements such that A/M<0.2; and where impurity minerals or compounds which are not integrated into the structure are not accounted for in the composition.

3. A magnesiosilicate compound according to claim 2 where 0.4<a<1.4, 0.2<b<0.6, 0.0≦c≦0.2, and 1.5<d<2.5; and where T/(Mg+Al+Si)<0.05.

4. A magnesiosilicate compound according to claim 3 where 0.6<a<1.3, 0.35<b<0.6, 0.0≦c≦0.1, and 1.65<d<2.25; and where T/(Mg+Al+Si)<0.02.

5. A magnesiosilicate compound according to claim 2 where Mg/Ca ≦100 and Si/(Mg+Ca)<1.4.

6. A magnesiosilicate compound according to claim 1 wherein M is selected from one or both of K and Na.

7. A magnesiosilicate compound according to claim 1 which has a stuffed silica polymorph-related structure, where the dominant X-ray powder diffraction peaks or groups of peaks occur simultaneously at a d-spacing of 4.30±0.15 Å and at a d-spacing of 2.64±0.22 Å.

8. A magnesiosilicate compound according to claim 1 which has a stuffed silica polymorph-related structure, where the dominant X-ray powder diffraction peak or group of peaks occurs at a d-spacing of 2.73±0.15 Å and a weaker peak or group of peaks at a d-spacing of 4.44±0.10 Å.

9. A magnesiosilicate compound according to claim 1 which has a stuffed silica polymorph-related structure, where the dominant X-ray powder diffraction peak occurs at a d-spacing of 3.11±0.20 Å.

10. A magnesiosilicate compound according to claim 1 which has a CBC of at least 50 mg CaO per gram at room temperature.

11. A magnesiosilicate compound according to claim 1 which has an MBC of at least 40 mg MgO per gram at room temperature.

12. A magnesiosilicate compound according to claim 1 which has a CBR of no more than 100 seconds at room temperature.

13. A magnesiosilicate compound according to claim 1 which has an oil adsorption (OA) of at least 50 g oil per 100 g of anhydrous material.

14. A magnesiosilicate compound according to claim 1 which is prepared using magnesiosilicate mineral starting material.

15. A magnesiosilicate compound according to claim 1 which has a CBC of at least 150 mg CaO per gram at room temperature.

16. A magnesiosilicate compound according to claim 1 which has an MBC of at least 140 mg MgO per gram at room temperature.

17. A magnesiosilicate compound according to claim 1 which has a CBR of no more then 10 seconds at room temperature.

18. A magnesiosilicate compound according to claim 1 which has an oil adsorption (OA) of at least 100 g oil per 100 g of anhydrous material.

19. A process for the preparation of a magnesiosilicate compound according to claim 1 and having a stuffed silica polymorph-related structure, which comprises subjecting a magnesiosilicate starting material, or a combination of magnesium oxide- and silicon oxide-containing reagents, to a solid state reaction with an alkali oxide- containing reagent.

20. A process according to claim 19 in which the reaction is performed at a temperature of about 1000° C. or less.

21. A process according to claim 20 in which the reaction is performed in a temperature range of about 450 to about 800° C.

22. A process according to claim 19 wherein the alkali oxide-containing reagent decomposes in air at a temperature below about 1000° C. to give alkali oxide.

23. A process according to claim 22 wherein the alkali oxide-containing reagent is selected from one or more of the group bicarbonate, carbonate, carboxylate, nitrate and hydroxide.

24. A process according to claim 19 wherein the alkali oxide-containing reagent contains one or both K and Na.

25. A process according to claim 19 wherein the magnesiosilicate starting material comprises a phyllosilicate mineral.

26. A process according to claim 25 wherein the phyllosilicate mineral is selected from one or both of talc and saponite.

27. A magnesiosilicate compound according to claim 1 useful as a water softener.

28. A magnesiosilicate compound according to claim 1 useful as a detergent builder.

29. A detergent composition containing a magnesiosilicate compound according to claim 1 and a surfactant.

30. A moulded body comprising magnesiosilicate compound according to claim 1, optionally further comprising a binder.

31. A process for the preparation of a magnesiosilicate compound having a layered structure with a characteristic broad X-ray powder diffraction peak occurring at a d-spacing of between 11 and 17 Å, which comprises treating a magnesiosilicate compound having a calcium binding capacity (CBC) of at least mg CaO per gram at room temperature, a magnesium binding capacity (MBC) of at least 10 mg MgO per gram at room temperature, a calcium binding rate (CBR) of no more than 300 seconds at room temperature, being the time taken to remove half of the $Ca^{2+}$ from a ~100 ppm $Ca^{2+}$ solution at a loading of 3 g per liter, and having a stuffed silica polymorph-related structure with aqueous solution.

32. A process according to claim 31 wherein the magnesiosilicate compound having a stuffed silica polymorph-related structure has a CBC of at least 20 mg CaO per gram at room temperature, an MBC of at least 15 mg MgO per gram at room temperature, and a CBR of no more then 200 seconds at room temperature.

33. A process according to claim 31 in which the magnesiosilicate compound having a stuffed silica polymorph-related structure is dispersed in the aqueous solution, and wherein residual solid is separated from supernatant liquid and dried.

34. A process according to claim 33 wherein the dispersing and separating steps take no more than about 20 minutes.

35. A process according to claim 33 wherein the separated residual solid is dried at less than about 100° C.

36. A process according to claim 33 wherein the dispersing and separating steps take less than about 10 minutes.

37. A process according to claim 33 wherein the separated residual solid is dried at less than about 60° C.

* * * * *